Figure 1:
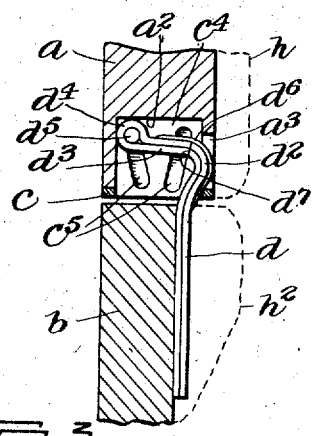

J. SOSS.

HINGE.

APPLICATION FILED APR. 7, 1920.

Reissued June 22, 1920.

14,899.

2 SHEETS—SHEET 1.

Inventor
Joseph Soss

By his Attorney
W. W. Canfield

J. SOSS.

HINGE.

APPLICATION FILED APR. 7, 1920.

Reissued June 22, 1920.

14,899.

2 SHEETS—SHEET 2.

Inventor
Joseph Soss

By his Attorney
W. W. Canfield

UNITED STATES PATENT OFFICE.

JOSEPH SOSS, OF NEW YORK, N. Y.

HINGE.

14,899. Specification of Reissued Letters Patent. Reissued June 22, 1920.

Original No. 1,335,400, dated March 30, 1920, Serial No. 281,358, filed March 8, 1919. Application for reissue filed April 7, 1920. Serial No. 372,086.

*To all whom it may concern:*

Be it known that I, JOSEPH SOSS, a citizen of the United States, and residing at New York, in the county of New York and State of New York, have invented certain new and useful Improvements in Hinges, of which the following is a specification, such as will enable those skilled in the art to which it appertains to make and use the same.

This invention relates to hinges and particularly to what are known as door hinges, and still more particularly to hinges for the doors of automobiles, and the object thereof is to provide an improved hinge of this class which is simple in construction, comparatively inexpensive and which will be efficient and strong and durable in use; and with this and other objects in view the invention consists in a hinge of the class specified, constructed as hereinafter described and claimed.

The invention is fully disclosed in the following specification, of which the accompanying drawings form a part, in which the separate parts of my improvement are designated by suitable reference characters in each of the views, and in which:—

Figure 2:
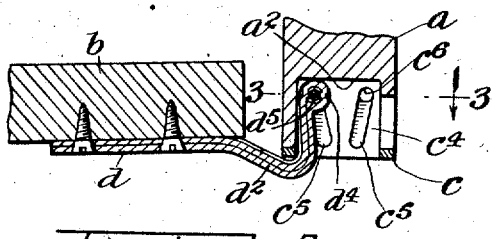
Figure 3:
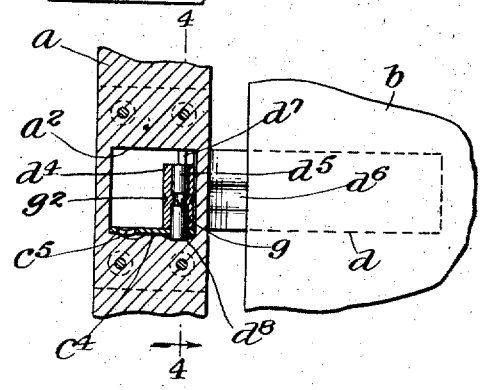
Figure 4:
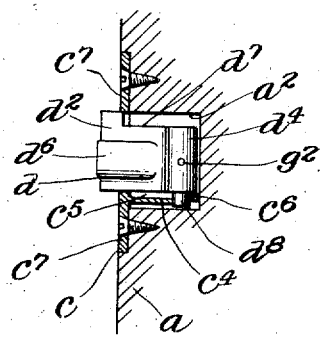
Figure 5:
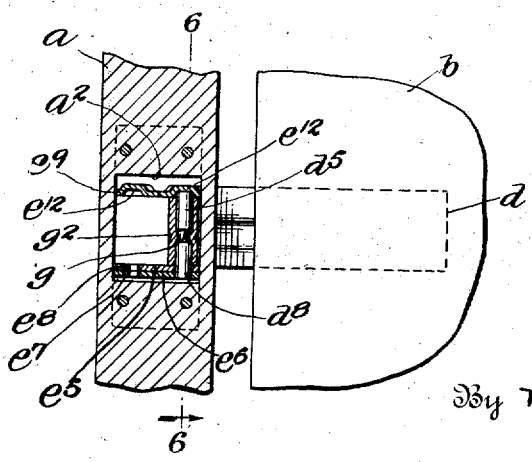
Figure 6:
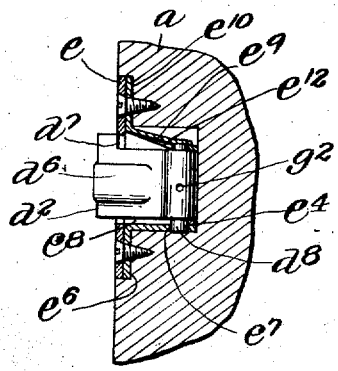
Figure 7:
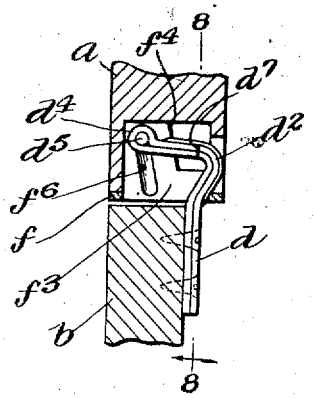
Figure 8:
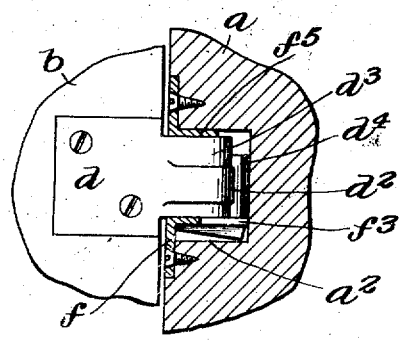
Figure 9:
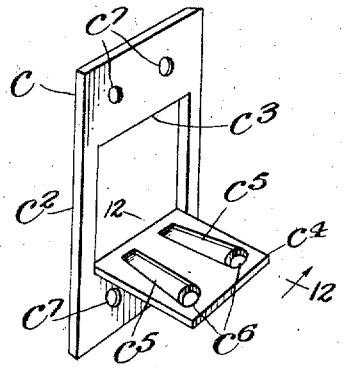
Figure 10:
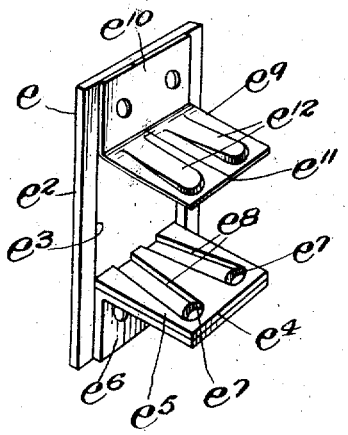
Figure 11:
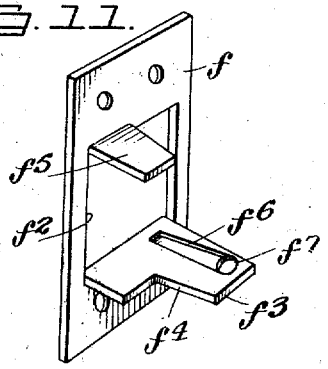
Figure 12:
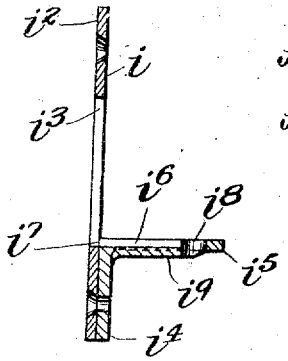

Figure 1 is a perspective sectional view of a part of a door frame and a part of a door and showing my improved hinge, the door being in a closed position;

Fig. 2 a view similar to Fig. 1 but showing the door open;

Fig. 3 a partial section on the line 3—3 of Fig. 2;

Fig. 4 a section on the line 4—4 of Fig. 3;

Fig. 5 a view similar to Fig. 3 but showing a modification;

Fig. 6 a section on the line 6—6 of Fig. 5;

Fig. 7 a view similar to Fig. 1 but showing another modification;

Fig. 8 a section on the line 8—8 of Fig. 7;

Fig. 9 a perspective view of the door frame hinge butt shown in Figs. 1 to 4 inclusive;

Fig. 10 a perspective view of the door frame hinge butt shown in Figs. 5 and 6;

Fig. 11 a perspective view of the door frame hinge butt shown in Figs. 7 and 8; and, Fig. 12 a section on the line 12—12 of Fig. 9 and showing another modification.

In the drawing forming part of this specification, I have shown at $a$ a part of a door frame of an automobile body and at $b$ a part of the door. The door frame $a$ is provided in the face thereof with a countersunk chamber $a^2$ which, in the construction shown, opens inwardly through the inner side of the door as shown at $a^3$, and, in the practice of my invention, I provide a door frame hinge butt $c$ shown detached in Fig. 9, and shown in position in Fig. 1, and said hinge butt consists of a plate $c^2$ having a central rectangular opening $c^3$ at the bottom of which is an inwardly directed supporting plate $c^4$ cut from the material of said plate $c$ and bent outwardly into the desired position as shown, and this formation of the supporting plate $c^4$ forms the opening $c^3$ in the hinge butt plate $c$.

The supporting plate $c^4$ is provided at its top surface with inwardly directed and diverging grooves $c^5$ at the inner ends of which are apertures $c^6$ which open downwardly through the bottom of the supporting plate $c^4$ and the grooves $c^5$ are formed by stamping or otherwise and reinforce and strengthen the supporting plate $c^4$ in addition to serving for the purpose hereinafter described.

In practice, the hinge butt member $c$ is secured to the door frame by means of screws passed through holes $c^7$ or in any other way, and the supporting plate $c^4$ passes into the chamber $a^2$ and fits in the bottom thereof.

That part of the hinge which is secured to the door $b$ consists of a butt member $d$ provided at one end with an elbow arm $d^2$ having an end portion $d^3$ which extends at approximately a right angle from the butt member $d$ and is provided in its end with a pin-hole $d^4$ in which is secured a pin $d^5$ and the entire part of the hinge member which is secured to the door is formed by folding a strip of sheet steel in the construction shown so as to form the pin-hole $d^4$ and the remainder of the butt member $d$ and elbow arm $d^2$ of two parts, and the outer part of said elbow arm is corrugated longitudinally and centrally as shown at $d^6$ to reinforce and strengthen said arm.

The top face or surface of the elbow arm $d^2$ of the butt member $d$ is also cut out longitudinally as shown at $d^7$ to form a longitudinal recess in the top surface of said elbow arm in order to facilitate the operation of connecting the door with the door frame when the parts of the hinges which are secured to the door are in position as are also those which are secured to, or in the door frame.

It will be understood that two or more of my improved hinges are employed in connection with a door, and it will be seen that the pin or pins $d^5$ in the elbow arm or arms $d^2$ project below the bottoms of said arms as shown at $d^8$ in Figs. 3 and 4, and in order to mount the door on the door frame, said door is held in the open position as shown in Fig. 4 and manipulated so as to pass the elbow arms $d^2$ of the hinge butt members $d$ into the chamber or chambers $a^2$ in the door frame, and in this operation the door is first slightly raised and the ends $d^8$ of the pin or pins $d^5$ are inserted into one of the grooves $c^5$ in the supporting plate $c^4$ of the hinge member secured in or to the door frame, and the elbow arms $d^2$ are passed backwardly until the ends $d^8$ of the pins $d^5$ drop into and through the apertures $c^6$ in the supporting plate $c^4$ of the hinge butt $c$ as clearly shown in Figs. 1 to 4 of the drawing. This completes the description of the construction of the hinge shown in Figs. 1 to 4 and Fig. 9 of the drawing, and also the method of applying and operating said hinge.

The modified form of construction shown in Figs. 5, 6 and 10 involves only a difference in the form and construction of the hinge butt member $e$ secured to the door frame and which is shown detached in Fig. 10, and in use in Figs. 5 and 6. This hinge butt member consists of a plate $e^2$ having a central rectangular opening $e^3$ at the bottom of which is an inwardly directed support $e^4$ consisting of a top plate $e^5$ formed integrally with the butt plate $e^2$ and a bottom reinforcing angle plate $e^6$ secured to said top plate and butt plate by welding or otherwise, and the angle plate $e^6$ is provided with apertures $e^7$, and the top plate $e^5$ is provided with inwardly diverging slots $e^8$, and these slots form in connection with the angle plate $e^6$ diverging grooves, the inner ends of which register with the apertures $e^7$ and the outer ends of which open outwardly.

In this construction, the top of the hinge butt plate $e^2$ is also provided on the inner side thereof with an inwardly directed spring plate $e^9$ which extends inwardly over the support $e^4$ and which, in the form of construction shown, is provided with an angle piece $e^{10}$ by which it is secured to the hinge butt plate $e^2$ and, in the construction shown, the spring plate $e^9$ is divided centrally and longitudinally as shown at $e^{11}$ into two parts each of which is provided on its under side with a longitudinal groove $e^{12}$ forming a corresponding rib on the top surface thereof, as clearly shown in Figs. 5 and 10.

In this form of construction the pin $d^5$ in the end of the elbow arm $d^2$ of the hinge butt member $d$ projects both above and below said arm as clearly shown in Fig. 5, and in manipulating the door so as to connect it with the door frame, as hereinbefore described, the top end of the pin $d^5$ enters one of the grooves $e^{12}$ in the spring plate member $e^9$ or one part thereof, and the lower end of said pin enters one of the grooves $e^8$ in the support $e^4$ and the said spring plate $e^9$, or the separate parts thereof, serve to depress the elbow arm $d^2$ of the hinge butt member $d$ and hold the same in the desired position at all times.

The object in providing the supporting members $e^4$ in the hinge construction shown in Figs. 1 to 4 inclusive with two of the grooves and two apertures is to make the hinge a double, or right and left, hinge so that the door may be mounted so as to swing in either direction, and this is also true of the grooved construction of the supporting member $e^4$ employed in Figs. 5 and 6 and shown detached in Fig. 10.

The modified form of construction shown in Figs. 7, 9 and 11 differs from the two forms of construction previously described, in the form and construction of the hinge butt member $f$ which is secured to the door frame and in the hinge butt member which is secured to the door. The hinge butt member which is secured to the door in this case is a slightly modified form of that shown in Figs. 1 to 4 and also 5 and 6, the difference being that the elbow arm $d^2$ is provided with a wider end or butt member $d$, and the hinge butt member $f$ which is secured to the door frame consists of a plate having a central opening $f^2$ at the bottom of which is an inwardly directed supporting plate $f^3$, one corner portion of which is cut out to form an annular recess $f^4$, and that part of the supporting plate $f^3$ which is cut out to form the recess $f^4$ forms at the top of the opening $f^2$ an inwardly directed member $f^5$. With this construction the supporting plate member $f^3$ at the bottom of the opening $f^2$ is provided with but one groove $f^6$ and one aperture $f^4$ and with this construction the hinge will not be a right and left hinge but can only be used in one way, or so that the door can be mounted in one position only so as to open in but one direction.

In this form of construction the pin $d^5$ in the end of the elbow arm $d^2$ projects only below said arm and operates in the aperture $f^7$ in the supporting member $f^3$, as hereinbefore described with reference to the previous forms of construction described, the distinctive feature of this particular form of construction being the inwardly directed member $f^5$ which bears on the top of the arm $d^2$, as shown in Fig. 8, and serves to hold said arm in position when the door is closed and to prevent rattling of said door.

The pin $d^5$ in all the forms of construction shown is preferably provided with a central groove $g$ as shown in Figs. 2, 3 and 5, and is held in place by crimps or indentations $g^2$ formed in the bearing $d^4$ of said pin, but said pin may be secured in position in any desired manner. It will be understood that the inner side of the door frame and the inner side of the door will, in practice, be upholstered in the usual manner and as indicated in dotted lines at $h$ and $h^2$ in Fig. 1, and my improved hinge device belongs, as will be seen, to the class known as invisible hinges, and while I have shown different forms of construction by which my invention may be carried into effect, the said invention is not limited to the details of construction herein shown and described, and changes therein and modifications thereof may be made, within the scope of the appended claims, without departing from the spirit of my invention, or sacrificing its advantages.

In all the forms of construction shown the hinge butt members connected with the door frame and door are formed of, or stamped from, sheet metal with the exception of the pin $d^5$ and this method of construction simplifies the process of making said parts and cheapens the same very materially, and this is one of the distinctive features of this invention and by means of this process of construction a hinge may be produced which will possess all the necessary strength and durability without the weight made necessary by other processes of construction.

In Fig. 12 of the drawing I have shown at $i$ another modified form of hinge butt member which is similar to that shown in Fig. 9 of the drawing but which is composed of two sheet metal parts secured together. The hinge butt member $i$ comprises a front plate $i^2$ having a central rectangular aperture $i^3$ and an angle plate $i^4$ secured to the bottom portion of the plate $i^2$ by riveting, welding or otherwise and the part $i^5$ of the angle plate $i^4$ extends inwardly to form the supporting plate of the hinge butt member $i$ and grooves $i^6$, only one of which is shown, are formed in the top face of the plate $i^5$, and open outwardly through said plate as shown at $i^7$, and the inner ends of which open into apertures $i^8$ into which the pins $d^5$, or the end portions $d^8$ thereof are adapted to pass in connecting the swinging member $d$ secured to the door in connection with the butt member $i$. The grooves $i^6$ form on the bottom face of the supporting plate $i^5$ corresponding reinforcing ribs $i^9$ which serve to strengthen the plate $i^5$.

The chief feature of the modified form of hinge butt member shown in Fig. 12 lies in the formation of the supporting plate $i^5$ separately from the plate $i^2$ and of stronger and heavier material as is shown in the drawing and securing said plate to the plate $i^2$, and when so secured the hinge member $i$ is practically the same in form of construction, as the hinge butt member $c$ shown in Fig. 9, and may be used in connection with the swinging member $d$ shown in Figs. 1 to 4 inclusive.

Having fully described my invention, what I claim as new and desire to secure by Letters Patent, is:—

1. A hinge butt member comprising a plate having a central opening at the bottom of which is an inwardly directed supporting member provided in the top surface with inwardly directed and diverging grooves at the inner ends of which are apertures or recesses, said plate member being also provided at the top of said opening with inwardly directed spring devices.

2. A hinge butt member comprising a plate having a central opening at the bottom of which is an inwardly directed supporting member provided in the top surface with inwardly directed and diverging grooves at the inner ends of which are apertures or recesses, said plate member being also provided at the top of said opening with inwardly directed spring devices having in their bottom surfaces inwardly directed grooves.

3. A hinge butt plate adapted to be secured to a stationary support and provided with a central opening having at the bottom thereof an inwardly directed reinforced member provided with an inwardly directed groove at the inner end of which is an aperture, said plate being also provided at the top of said opening with an inwardly directed bearing member.

4. A hinge butt plate provided with a central opening at the bottom of which is an inwardly directed reinforced support provided in its top surface with inwardly directed grooves having apertures at their ends.

5. A hinge butt member composed of sheet metal and comprising a front plate apertured centrally thereof and an inwardly directed supporting plate, the upper face of said supporting plate being depressed to form grooves therein and corresponding reinforcing ribs on the bottom face of said plate and the inner end portion of said plate being provided with apertures which register with the inner ends of said grooves.

6. In a hinge, a hinge butt member adapted to be secured to a stationary support and comprising a front plate and an inwardly directed grooved and apertured supporting plate, the swinging member of the hinge being composed of sheet metal and being provided with a vertical pin one end of which protrudes beyond said member and is adapted to operate in connection with the grooved and apertured portions in the supporting plate in the connection of said swinging member with the hinge butt member, and said pin being secured to the swinging member by providing a reduced central portion thereon and crimping opposite sides of said member to engage said reduced portion, substantially as shown and described.

7. A hinge butt plate adapted to be secured to a stationary support and provided with a central rectangular opening, and having at the bottom of said opening an inwardly directed flat support provided in its top surface with an inwardly directed groove at the inner end of which is an aperture.

8. A hinge butt plate formed from a piece of sheet metal and provided at one side thereof with a support which ranges at an angle thereto and which is stamped from the material of said plate and bent into the desired position.

9. A hinge butt plate formed from a piece of sheet metal and provided at one side thereof with a support which ranges at an angle thereto and which is stamped from the material of said plate and bent into the desired position, and means for reinforcing said support.

10. A hinge butt plate formed from a piece of sheet metal and provided at one side thereof with two members which range at an angle thereto and which are stamped from the material of said plate and bent into the desired position, in which operation an opening is formed in said plate.

In testimony that I claim the foregoing as my invention I have signed my name, in presence of the subscribing witnesses this 6th day of April, 1920.

JOSEPH SOSS.

Witnesses:
C. E. MULREANY,
H. E. THOMPSON.